United States Patent [19]
Suda et al.

[11] Patent Number: 5,821,280
[45] Date of Patent: Oct. 13, 1998

[54] PROCESS FOR PRODUCING CONDUCTIVE COMPOSITION FOR BIOLOGICAL ELECTRODE

[75] Inventors: Shin Suda; Toru Kurata; Toshihiro Fukai; Kenichiro Maeda, all of Tokyo, Japan

[73] Assignee: Nihon Kohden Corporation, Tokyo, Japan

[21] Appl. No.: 687,920

[22] Filed: Jul. 26, 1996

[30] Foreign Application Priority Data

Jul. 27, 1995 [JP] Japan .................................. 7-191448

[51] Int. Cl.$^6$ ...................................................... C08K 2/50
[52] U.S. Cl. .............................. 522/84; 522/68; 522/175; 522/182; 522/178; 522/180; 522/167; 522/66; 522/8; 522/18; 522/39; 522/42
[58] Field of Search ............................... 522/84, 68, 182, 522/175, 178, 180, 167, 66, 8, 18, 39, 42; 514/625, 408; 424/423, 44

[56] References Cited

U.S. PATENT DOCUMENTS

| | | | |
|---|---|---|---|
| 4,666,707 | 5/1987 | Eguchi et al. | 424/44 |
| 4,851,434 | 7/1989 | Deckner | 514/847 |
| 5,042,144 | 8/1991 | Shimada et al. | 29/825 |

FOREIGN PATENT DOCUMENTS

| | | |
|---|---|---|
| B 229328 | 6/1990 | Japan . |
| B 819394 | 2/1996 | Japan . |

Primary Examiner—Marion E. McCamish
Assistant Examiner—Cheryl Juska
Attorney, Agent, or Firm—Sughrue, Mion, Zinn, Macpeak & Seas, PLLC

[57] ABSTRACT

A process for producing a conductive composition for a biological electrode wherein casting or injection is preformed while maintaining the flowability of the feedstock solution to thereby enable the molding of the solid gel into a desired shape. A process for producing a conductive gel composition for a biological electrode having a function of electrically and physically connecting a living body to an electrode element and comprising at least the following components:

(1) a radical-polymerizable unsaturated compound;
(2) an acid reacting with NaOH or KOH to thereby give a reaction product which is a moisturizer serving as a plasticizer and having a function of supplementing and promoting the physiological humidifying function of the horny layer;
(3) water;
(4) NaOH and/or KOH;
(5) a photopolymerization or light polymerization initiator; and
(6) a crosslinking agent.

which comprises preparing a first solution containing at least the components (1) and (2) and a second solution containing at least the components (3) and (4) independently, mixing the first and second solutions and then subjecting the resulting mixture to irradiation with light or heating.

10 Claims, No Drawings

PROCESS FOR PRODUCING CONDUCTIVE COMPOSITION FOR BIOLOGICAL ELECTRODE

FIELD OF THE INVENTION

This invention relates to a conductive composition to be located between the skin and an electrode element when a biological electrode is applied to the skin.

BACKGROUND OF THE INVENTION

A biological electrode consists of an electrode element made of silver, silver/silver chloride, carbon and the like and a conductive composition connecting the electrode element to the skin and is applied to the surface of a living body in order to output some bioelectrical phenomena (e.g., electrocardiogram, electromyogram, etc.) or electrically stimulate the living body.

Normal human skin has an external layer called "horny layer" which protects the living body against the invasion of various foreign factors. When the skin is contacted with the dry atmosphere, the moisture is lost from the horny layer. Also, the moisture content in the horny layer is reduced as aging proceeds. In such cases, the electrical resistance of the horny layer is elevated. The surface of the skin is not smooth but uneven and has a complicated shape, for example, being curved.

When an electrode element is contacted directly with the skin surface containing less moisture in the horny layer, it is frequently observed that the contact of the electrode element to the skin is inhibited and thus the effective contact area is reduced. As a result, the contact resistance is elevated. In addition, the resistance of the horny layer per se has been elevated as described above. Thus the total electrical resistance is considerably elevated, which causes some troubles, for example, the bioelectrical signal thus output picks up noise, only an unstable record can be obtained, or no record can be obtained in some cases. When the surface of a living body is electrically stimulated via an electrode, the high resistance at the contact area brings about an increase in the current density and thus causes damages such as burn to the living body.

To solve these problems, conductive compositions in the form of liquid, jelly or gel are generally employed in biological electrodes so as to reduce the skin resistance between the living body and the electrode element. These conductive compositions contain a large amount of water and/or electrolytes such as NaCl or KCl which are externally absorbed by the skin horny layer to thereby reduce the skin resistance. Owing to the characteristics of the components, however, such a conductive composition per se has a low viscosity and a high flowability, which makes it difficult to stably sustain the conductive composition between the electrode element and the skin for a prolonged period of time. Thus the electrode element should be provided with a containment space or a holding means such as sponge for supporting the conductive composition. The electrode element should be further provided with an adhesive tape for fixing it on the skin surface. When an adhesive tape is used, however, repeated application and removal of the electrode element cause mechanical damage to the skin.

When an electrode element is applied to the skin surface for a long time via such a conductive composition in an ICU, Holter's electrocardiography, etc., the conductive composition bears mechanical load due to body motion and external pressure. The conductive composition leaks from the electrode element to cause detachment of the electrode element or unstable contact of the electrode element with the skin, thus making it impossible to record the biological signals.

In addition, such a conductive composition is dried during application due to the evaporation of the moisture contained therein. Thus the skin resistance is elevated, thereby making the record of the biological signals unstable. Furthermore, the evaporation of the moisture contained in the conductive composition causes an increase in the chlorine ion concentration in the conductive composition, which induces skin irritation. After the removal of the electrode element, furthermore, such a conductive composition remains on the skin and causes rash.

There are electrode elements usable repeatedly and so-called disposable ones which are thrown away after being used once. In the former ones, a conductive composition is applied to the skin immediately before use. In the latter ones, on the other hand, a conductive composition has been preliminarily filled or incorporated into the electrode in many cases so that they can be easily applied. In the latter case, therefore, it is required to have a structure that the conductive composition is kept not dried until it is used and to store the conductive composition in an airtight package to thereby prevent it from drying during storage. Accordingly, an electrode element of the latter type should have a complicated structure as a whole with taking the use and storage thereof into consideration.

To produce the above-mentioned conductive composition, a feedstock solution is first prepared and poured into a mold followed by UV irradiation or heating for initiating crosslinking polymerization. However, it is observed in some cases that the acrylic acid monomer undergoes spontaneous polymerization immediately after the feedstock solution is prepared owing to a moisturizer contained in the feedstock solution. This is because the moisturizer has a function of reducing the pH value at which spontaneous polymerization of the acrylic acid monomer is initiated and further the acrylic acid becomes unstable, although the acrylic acid monomer generally undergoes spontaneous polymerization due to unstable double bonds when the pH value is high.

When the moisturizer is added at the higher ratio, then the above-mentioned phenomenon occurs at the higher frequency. When the spontaneous polymerization arises, the feedstock solution becomes more viscous and less flowable and gelation occurs before the initiation of the crosslinking polymerization. As a result, the feedstock solution can be hardly poured into a mold and thus short shot of the feedstock solution makes it impossible to mold the solid gel by casting or injection.

Today, biological electrodes are employed for various purposes including electrodiography, electroencephalography, electromyography, stimulation, etc. and, therefore, they are processed into various, complicated forms depending on the purposes. When the solid gel molding by casting or injection becomes impossible, these requirements cannot be satisfied.

On the other hand, it is sometimes effected to impregnate a network reinforcement with a solid gel feedstock solution followed by crosslinking polymerization. When the flowability of the feedstock solution is lowered due to spontaneous polymerization, however, the reinforcement is scarcely impregnated with the feedstock solution and thus the desired gel composition cannot be obtained.

When the flowability of the feedstock solution is lowered before the initiation of the crosslinking polymerization, furthermore, the crosslinking polymerization cannot uniformly proceed and there remain partially unpolymerized monomers, thus causing skin irritation. In addition, the occurrence of the spontaneous polymerization makes the feedstock solution chemically unstable and thus shortens its pot life. In such a case, it is difficult to prepare the feedstock solution in a large batch, which brings about a problem that mass production on, for example, an automated line can be hardly performed. In the case of sheet type electrodes which are continuously produced by applying a feedstock solution onto film-type electrode elements, the spontaneous polymerization of the feedstock solution causes an increase in the viscosity of the feedstock solution and makes it chemically unstable. As a result, the gelation proceeds and the application of the feedstock solution becomes difficult.

SUMMARY OF THE INVENTION

An object of the present invention is to provide a process for producing a conductive composition wherein casting or injection is performed while maintaining the flowability of the feedstock solution to thereby mold the feedstock solution into a solid gel of a desired shape.

The present invention relates to a process for producing a conductive gel composition for a biological electrode having a function of electrically and physically connecting a living body to an electrode element and comprising the following components:

(1) a radical-polymerizable unsaturated compound;

(2) an acid reacting with NaOH or KOH to thereby give a reaction product which is a moisturizer serving as a plasticizer and having a function of supplementing and promoting the physiological humidifying function of the horny layer;

(3) water;

(4) NaOH and/or KOH;

(5) a photopolymerization or light polymerization initiator; and (6) a crosslinking agent, which comprises preparing a first solution containing at least the components (1) and (2) and a second solution containing at least the components (3) and (4) independently, mixing the first and second solutions together and then subjecting the resulting mixture to irradiation with light or heating.

DETAILED DESCRIPTION OF THE INVENTION

The unsaturated compound of the component (1) contained in the conductive composition of the present invention is selected from the group consisting of acrylic acid, methacrylic acid, crotonic acid, itaconic acid, acrylamide, methacrylamide, 2-acrylamido-2-methylpropane-sulfonic acid and salts thereof, and mixtures thereof, an acrylic acid/vinylpyrrolidone mixture, a vinyl acetate/ethylene mixture and a vinyl acetate/dioctyl maleate mixture.

These unsaturated compounds make it possible to easily perform the polymerization.

The acid employed as the component (2), which reacts with NaOH or KOH to give a moisturizer, is lactic acid, pyrrolidonecarboxylic acid or a combination thereof.

Because of being ionic, such a moisturizer can elevate the conductivity of the conductive composition per se without adding any electrolyte (NaCl, KCl, etc.), different from the conventional cases wherein nonionic polyhydric alcohols are added as a plasticizer.

When the moisturizer penetrates into the skin horny layer, the water contained in the tissue binds to the moisturizer to thereby improve the humidifying properties of the horny layer per se. Thus the moisture content in the skin horny layer can be elevated. An increase in the moisture content in the skin horny layer results in a decrease in the electrical resistance of the horny layer and, in its turn, reduces the impedance of the electrode against the skin.

Since the moisturizer contributes to the reduction of the impedance to the skin, the moisture content in the conductive composition can be regulated to a low level and thus the stickiness thereof can be improved. As a result, the evaporation of the moisture from the composition can be suppressed during storage or application.

It is also possible to avoid the problem of the loss in stickiness due to the oozing of water from the conductive composition. Moreover, the conductive composition is free from any skin troubles caused by the percutaneous absorption of the excessive water or electrolytes, etc.

Since such a moisturizer is contained in the horny layer inherently, the addition thereof scarcely causes any skin irritation.

The moisturizer (pyrrolidonecarboxylic acid, lactic acid, etc.) also has an effect of imparting stickiness. Thus the stickiness of the composition to the skin can be further strengthened by adding it. In addition, the stickiness of the composition to the skin can be arbitrarily controlled easily by varying its content. That is to say, the moisturizer has four functions (i.e., as a plasticizer, as an electrolyte, as an agent for increasing the moisture content in the horny layer and as a an agent of imparting stickiness). Thus it is the most desirable material as a component of a conductive composition for a biological electrode.

The photopolymerization initiator of the component (5) is selected from the group consisting of benzildimethyl-ketal, 1-hydroxycyclohexyl phenyl ketone, an eutectic mixture of 1-hydroxycyclohexyl phenyl ketone with benzophenone, 2-methyl-1-[4-(methylthio)phenyl]-2-morpholino-propanone-1, 2-benzyl-2-dimethylamino-1-(4-morpholinophenyl)-butanone-1, 2-hydroxy-2-methyl-1-phenylpropan-1-one, a mixture of 2-hydroxy-2-methyl-1-phenylpropan-1-one with 2,4,6-trimethylbenzoyldiphenylphosphine oxide, a mixture of 2-hydroxy-2-methyl-1-phenylpropan-1-one with bisacylphosphine oxide, 1-[4-(2-hydroxyethoxy)phenyl]-2-hydroxy-2-methyl-1-propan-1-one and bis (cyclopentadienyl)-bis(2,6-difluoro-3-(pyr-1-yl)titanium.

The heat polymerization initiator of the component (5) is selected from the group consisting of azobisisobutyronitrile, benzoyl peroxide, lauroyl peroxide, methyl ethyl ketone peroxide, cyclohexanone peroxide, t-butyl hydroperoxide, di-t-butyl peroxide, di-t-amyl peroxide, dicumyl peroxide and t-butyl perbenzoate.

When the photopolymerization initiator is used, a polymerization reaction proceeds by irradiation with light. When the heat polymerization initiator is used, a polymerization reaction proceeds by heating.

The crosslinking agent of the component (6) is selected from the group consisting of N,N'-methylenebis-acrylamide, ethylene glycol dimethacrylate, polyethylene glycol 400 diacrylate, diethylene glycol diacrylate, 1,3-butanediol diacrylate, 1,4-butanediol diacrylate, 1,6-hexanediol diacrylate, neopentylglycol diacrylate, neopentyl glycol diacryl hydroxypivalate, trimethylolpropane triacrylate, pentaerythritol triacrylate, dipentaerythritol hexaacrylate and trimethylolpropane trimethacrylate.

The content of each component may be adjusted to form an appropriate gel composition, for example, as follows.

When the first solution contains an acrylic acid monomer as the unsaturated compound, pyrrolidonecarboxylic acid as the acid giving a moisturizer, N,N'-methylenebisacryletalamide as the crosslinking agent and benzyldimethyl-ketal as the photopolymerization initiator, their contents are preferably adjusted to amounts of from 20 to 50% by weight, from 1 to 43% by weight, from 0.01 to 1% by weight and from 0.01 to 1% by weight, respectively, each based on the weight of the mixture of the first solution with the second solution, while the second solution contains water and NaOH in amounts of from 7 to 25% by weight and from 0.2 to 13% by weight, respectively, each based on the weight of the mixture of the first solution with the second solution, together with KOH in such an amount as to adjust the pH value of the mixture to 4.0 to 8.0.

When the first solution contains an acrylic acid monomer as the unsaturated compound, lactic acid as the acid giving a moisturizer, N,N'-methylenebisacryletalamide as the crosslinking agent and benzyldimethylketal as the photopolymerization initiator, their contents are preferably adjusted to amounts of from 20 to 50% by weight, from 1 to 32% by weight, from 0.01 to 1% by weight and from 0.01 to 1% by weight, respectively, each based on the weight of the mixture of the first solution with the second solution, while the second solution contains water and NaOH in amounts of from 10 to 25% by weight and from 0.3 to 32% by weight, respectively, each based on the weight of the mixture of the first solution with the second solution, together with KOH in such an amount as to adjust the pH value of the mixture to 4.0 to 8.0.

When the first solution contains an acrylic acid monomer as the unsaturated compound, pyrrolidonecarboxylic acid as the acid giving a moisturizer, N,N'-methylenebisacryletalamide as the crosslinking agent and benzyldimethyl-ketal as the photopolymerization initiator, their contents are preferably adjusted to in amounts of from 20 to 50% by weight, from 1 to 43% by weight, from 0.01 to 1% by weight and from 0.01 to 1% by weight, respectively, each based on the weight of the mixture of the first solution with the second solution, while the second solution contains water in an amount of from 8 to 25% by weight based on the weight of the mixture of the first solution with the second solution and KOH in such an amount as to adjust the pH value of the mixture to 4.0 to 8.0.

When the first solution contains an acrylic acid monomer as the unsaturated compound, lactic acid as the acid giving a moisturizer, N,N'-methylenebisacryletalamide as the crosslinking agent and benzyldimethylketal as the photopolymerization initiator, their contents are preferably adjusted to amounts of from 20 to 50% by weight, from 1 to 35% by weight, from 0.01 to 1% by weight and from 0.01 to 1% by weight, respectively, each based on the weight of the mixture of the first solution with the second solution, while the second solution contains water in an amount of from 6 to 25% by weight based on the weight of the mixture of the first solution with the second solution and KOH in such an amount as to adjust the pH value of the mixture to 4.0 to 8.0.

In each of the above compositions, benzyldimethyl-ketal employed as the photopolymerization initiator and N,N'-methylenebisacrylamide employed as the crosslinking agent are contained in the solution which contained acrylic acid as the radical-polymerizable unsaturated compound and pyrrolidonecarboxylic acid or lactic acid as the acid serving as the moisturizer. Alternatively, such a polymerization initiator or crosslinking agent may be contained in the solution containing water, KOH and/or NaOH to thereby achieve similar effects.

The first solution is mixed with the second solution under stirring under the conditions that a temperature ranges from the solidifying point of the solution to 30° C. and a pH value ranges from 4.0 to 8.0, for the period sufficient to make the mixture homogeneous.

When the photopolymerization initiator is used, polymerization is carried out by irradiation with an ultraviolet light using a UV irradiator such as a high pressure mercury lamp (output: 750 W, irradiation distance 180 mm) for a period to achieve crosslinking polymerization sufficiently. The UV irradiation may be carried out in a nitrogen atmosphere.

When the heat polymerization initiator is used, polymerization is carried out by heating at a constant temperature in a thermal reactor for a period to achieve crosslinking polymerization sufficiently. The heat polymerization may be carried out in a nitrogen atmosphere.

In the process for producing a conductive composition in accordance with the present invention, the pH value of the first solution is regulated to a low level by the acid employed as the component (2) and thus the spontaneous polymerization of the unsaturated compound employed as the component (1) is suppressed. The second solution is free from any component which may possibly change when stored for a long time. When the first solution is mixed with the second solution and the resulting mixture is subjected to a polymerization reaction by irradiation with light or heating, then the unsaturated compound employed as the component (1) undergoes crosslinking polymerization. Further, the acid employed as the component (2) and NaOH or KOH employed as the component (4) together form a moisturizer which also serves as a plasticizer. Furthermore, the acid having a high acidity of the component (2) participates in neutralization selectively with NaOH or KOH of the component (4) to thereby prevent the unsaturated compound of the component (1) from becoming unstable due to NaOH or KOH, i.e., the component (4) for a long time.

Thus, the first and second solutions can be each stored for a long time while sustaining its flowability.

As described above, the feedstock solution remains flowable after the preparation, which enables molding of the solid gel conductive composition by casting or injection. When a reinforcement in the form of a net and the like is impregnated with the feedstock solution which is then subjected to crosslinking polymerization, the high flowability of the feedstock solution facilitates the impregnation and ensures the acquisition of the target gel composition.

In addition, the whole feedstock solution undergoes homogeneous polymerization. Thus the crosslinked gel composition suffers from no unevenness in the crosslinking polymerization but has stable qualities. Furthermore, this gel composition contains no unpolymerized monomer remaining therein and thus scarcely causes any skin damages.

It is also possible to continuously manufacture sheet electrodes by applying the feedstock solution to film electrodes.

As described above, the present invention makes it possible to stably produce a conductive composition in the form of a solid gel which contains a moisturizer in an amount required for the performance as the conductive composition.

The following examples illustrate the present invention in more detail, but are not to be construed to limit the scope of the invention. In the examples, the term "part" means "part by weight" unless otherwise indicates.

EXAMPLE 1

To 38 parts of acrylic acid monomer were added 0.19 parts of N,N'-methylenebisacrylamide and 0.19 parts of benzyldimethylketal and homogeneously dissolved under stirring. These components may be added at an arbitrary order. Next, 17 parts of pyrrolidonecarboxylic acid was added thereto. Although the pyrrolidonecarboxylic acid was precipitated, no problem was caused thereby. The solution thus obtained was referred to as the solution 1A.

Since the above-mentioned procedure was accompanied by the evolution of little reaction heat, no particular operation for cooling, etc. was required therefor. After mixing, the obtained solution was sealed in a container and stored in a dark place at 10° C. or below so as to minimize the spontaneous polymerization of the acrylic acid monomer.

Next, 5 parts of NaOH and 24 parts of KOH were added to 15 parts of water and homogeneously dissolved therein under stirring. The solution thus obtained was referred to as the solution 1B. Since the dissolution of NaOH and KOH was accompanied by the evolution of heat, NaOH and KOH were added gradually so as to prevent the solution from boiling or scattering due to the dissolution heat. After mixing, the solution 1B was sealed in a container and stored.

Then the solution 1B was added to the solution 1A while cooling and stirring so as to regulate the solution temperature not to exceed 30° C. and homogeneously dissolved. In the process of the addition, the pyrrolidonecarboxylic acid precipitated in the solution 1A was gradually dissolved and a transparent solution was finally obtained. The solution thus obtained was referred to as the solution 1. In this step, the mixing was accompanied by the heat evolution. Thus the solution 1B was added slowly so as to prevent the spontaneous polymerization of the acrylic acid monomer and the boiling or scattering of the solution due to the neutralization heat.

After mixing, the solution 1 was sealed in a container and stored in a dark place at 10° C. or below so as to minimize the spontaneous polymerization of the acrylic acid monomer.

Subsequently, the solution 1 was filled in a silicone mold (width: 50 mm, length: 800 mm, thickness: 1.5 mm) and irradiated by using an ultraviolet light irradiator (a high pressure mercury lamp, output: 750 W, irradiation distance: 180 mm) for 15 seconds to thereby perform crosslinking polymerization. Thus a transparent and sticky conductive composition in the form of a solid gel sheet was obtained.

EXAMPLE 2

To 38 parts of acrylic acid monomer were added 0.19 parts of N,N'-methylenebisacrylamide, 0.19 parts of benzyldimethylketal and 16 parts of lactic acid and homogeneously dissolved under stirring. The solution thus obtained was referred to as the solution 2A. These components may be added at an arbitrary order.

Since the above-mentioned procedure was accompanied by the evolution of little reaction heat, no particular operation for cooling, etc. was required therefor. After mixing, the resulting solution was sealed in a container and stored in a dark place at 10° C. or below so as to minimize the spontaneous polymerization of the acrylic acid monomer.

Next, 7 parts of NaOH and 24 parts of KOH were added to 14 parts of water and homogeneously dissolved therein under stirring. The solution thus obtained was referred to as the solution 2B. Since the dissolution of NaOH and KOH was accompanied by the evolution of heat, NaOH and KOH were added gradually so as to prevent the solution from boiling or scattering due to the dissolution heat. After mixing, the solution 2B was sealed in a container and stored.

Then the solution 2B was added to the solution 2A while cooling and stirring so as to regulate the solution temperature not to exceed 30° C. and homogeneously dissolved. The solution thus obtained was referred to as the solution 2. In this step, the mixing was accompanied by the heat evolution. Thus the solution 2B was added slowly so as to prevent the spontaneous polymerization of the acrylic acid monomer and the boiling or scattering of the solution due to the neutralization heat.

After mixing, the solution 2 was sealed in a container and stored in a dark place at 10° C. or below so as to minimize the spontaneous polymerization of the acrylic acid monomer.

Subsequently, the solution 2 was filled in a silicone mold (width: 50 mm, length: 800 mm, thickness: 1.5 mm) and irradiated by using an ultraviolet light irradiator (a high pressure mercury lamp, output: 750 W, irradiation distance: 180 mm) for 15 seconds to thereby perform crosslinking polymerization. Thus a transparent and sticky conductive composition in the form of a solid gel sheet was obtained.

EXAMPLE 3

To 31 parts of acrylic acid monomer were added 0.16 parts of N,N'-methylenebisacrylamide and 0.16 parts of benzyldimethylketal and homogeneously dissolved under stirring. These components may be added at an arbitrary order. Next, 26 parts of pyrrolidonecarboxylic acid was added thereto. Although the pyrrolidonecarboxylic acid was precipitated, no problem was caused thereby. The solution thus obtained was referred to as the solution 3A.

Since the above-mentioned procedure was accompanied by the evolution of little reaction heat, no particular operation for cooling, etc. was required therefor. After mixing, the resulting solution was sealed in a container and stored in a dark place at 10° C. or below so as to minimize the spontaneous polymerization of the acrylic acid monomer.

Next, 31 parts of KOH was added to 13 parts of water and homogeneously dissolved therein under stirring. The solution thus obtained was referred to as the solution 3B. Since the dissolution of KOH was accompanied by the evolution of heat, KOH were added gradually so as to prevent the solution from boiling or scattering due to the dissolution heat. After mixing, the solution 3B was sealed in a container and stored.

Then the solution 3B was added to the solution 3A while cooling and stirring so as to regulate the solution temperature not to exceed 30° C. and homogeneously dissolved. In the process of the addition, the pyrrolidonecarboxylic acid precipitated in the solution 3A was gradually dissolved and a transparent solution was finally obtained. The solution thus obtained was referred to as the solution 3. In this step, the mixing was accompanied by the heat evolution. Thus the solution 3B was added slowly so as to prevent the spontaneous polymerization of the acrylic acid monomer and the boiling or scattering of the solution due to the neutralization heat.

After mixing, the solution 3 was sealed in a container and stored in a dark place at 10° C. or below so as to minimize the spontaneous polymerization of the acrylic acid monomer.

Subsequently, the solution 3 was filled in a silicone mold (width: 50 mm, length: 800 mm, thickness: 1.5 mm) and irradiated by using an ultraviolet light irradiator (a high pressure mercury lamp, output: 750 W, irradiation distance: 180 mm) for 15 seconds to thereby perform crosslinking polymerization. Thus a transparent and sticky conductive composition in the form of a solid gel sheet was obtained.

EXAMPLE 4

To 28 parts of acrylic acid monomer were added 0.13 parts of N,N'-methylenebisacrylamide, 0.13 parts of benzyldimethylketal and 24 parts of lactic acid and homogeneously dissolved under stirring. The solution thus obtained was referred to as the solution 4A. These components may be added at an arbitrary order.

Since the above-mentioned procedure was accompanied by the evolution of little reaction heat, no particular operation for cooling, etc. was required therefor. After mixing, the resulting solution was sealed in a container and stored in a dark place at 10° C. or below so as to minimize the spontaneous polymerization of the acrylic acid monomer.

Next, 33 parts of KOH was added to 15 parts of water and homogeneously dissolved therein under stirring. The solution thus obtained was referred to as the solution 4B. Since the dissolution of KOH was accompanied by the evolution of heat, KOH was added gradually so as to prevent the solution from boiling or scattering due to the dissolution heat. After mixing, the solution 4B was sealed in a container and stored.

Then the solution 4B was added to the solution 4A while cooling and stirring so as to regulate the solution temperature not to exceed 30° C. and homogeneously dissolved. The solution thus obtained was referred to as the solution 4. In this step, the mixing was accompanied by the heat evolution. Thus the solution 4B was added slowly so as to prevent the spontaneous polymerization of the acrylic acid monomer and the boiling or scattering of the solution due to the neutralization heat.

After mixing, the solution 4 was sealed in a container and stored in a dark place at 10° C. or below so as to minimize the spontaneous polymerization of the acrylic acid monomer.

Subsequently, the solution 4 was filled in a silicone mold (width: 50 mm, length: 800 mm, thickness: 1.5 mm) and irradiated by using an ultraviolet light irradiator (a high pressure mercury lamp, output: 750 W, irradiation distance: 180 mm) for 15 seconds to thereby perform crosslinking polymerization. Thus a transparent and sticky conductive composition in the form of a solid gel sheet was obtained.

COMPARATIVE EXAMPLE 1

To 22 parts of acrylic acid monomer were added 0.09 parts of N,N'-methylenebisacrylamide, 0.09 parts of benzyldimethylketal, 13 parts of water, 50 parts of pyrrolidonecarboxylic acid and 13 parts of KOH in this order while homogeneously stirring and cooling so as to regulate the solution temperature not to exceed 30° C.

One minute after mixing, the solution set to gel just like sherbet or corn snow and did not flow even though the container was tilted. Thus, casting or injection of the product into an electrode mold was impossible in practice.

COMPARATIVE EXAMPLE 2

To 22 parts of acrylic acid monomer were added 0.09 parts of N,N'-methylenebisacrylamide, 0.09 parts of benzyldimethylketal, 13 parts of water, 50 parts of potassium lactate and 13 parts of KOH in this order while homogeneously stirring and cooling so as to regulate the solution temperature not to exceed 30° C.

One minute after mixing, the solution set to gel just like sherbet or corn snow and did not flow even though the container was tilted. Thus, casting or injection of the product into an electrode mold was impossible in practice.

Table 1 shows the compositions and properties of the conductive compositions of Examples 1 to 4 and Comparative Examples 1 and 2. As the evaluation data indicate, the two-solution type of Examples 1 to 4 each sustained its flowability 7 days or longer after the preparation. After mixing these solutions, the resulting product sustained its flowability for 7 days or longer. In contrast, the one-solution type of Comparative Examples 1 and 2 each lost its flowability 1 minute after the preparation. In Table 1, "O" means "yes" and "x" means "no".

TABLE 1

| Composition (wt. %) (Type) | Comp. Ex. 1 1-soln. | Comp. Ex. 2 1-soln. | Ex. 1 2-soln. | Ex. 2 2-soln. | Ex. 3 2-soln. | Ex. 4 2-soln. |
|---|---|---|---|---|---|---|
| N,N'-methylenebisacrylamide | 0.09 | 0.09 | 0.19 | 0.19 | 0.16 | 0.13 |
| benzyldimethylketal | 0.09 | 0.09 | 0.19 | 0.19 | 0.16 | 0.13 |
| acrylic acid monomer | 22 | 22 | 38 | 38 | 31 | 28 |
| NaOH | — | — | 5 | — | — | — |
| KOH | 13 | 13 | 24 | 24 | 31 | 33 |
| water | 13 | 13 | 15 | 14 | 13 | 15 |
| potassium PCA | 50 | — | — | — | — | — |
| potassium lactate | — | 50 | — | — | — | — |
| PCA | — | — | 17 | — | 26 | — |
| lactic acid | — | — | — | 16 | — | 24 |
| Evaluation: change in flowability (time required for losing flowability) | | | | | | |
| 1 soln.-type (min) | 1 | 1 | — | — | — | — |
| 2 soln.-type A (days) | — | — | >7 | >7 | >7 | >7 |
| B (days) | — | — | >7 | >7 | >7 | >7 |
| gelation capacity | x | x | O | O | O | O |
| pot life (days) | x | x | >7 | >7 | >7 | >7 |

Tables 2 to 8 show the results of trial production of feedstock solutions of the one-solution or two-solution type wherein the contents of the components (% by weight) were varied. Samples of the one-solution type were prepared in the same manner as described in Comparative Example 1 or 2, while samples of the two-solution type were prepared in the same manner as in Examples 1 to 4. The evaluation items include "preparability (whether spontaneous polymerization occurs or not)" of each solution and "gelation capacity" of each product thus prepared. O means "yes" while x means "no".

TABLE 2

| Composition (wt. %) moisturizer (%) (Type) | S1<br>1<br>1-soln. | S2<br>1<br>1-soln. | S3<br>1<br>1-soln. | S4<br>1<br>1-soln. | S5<br>1<br>2-soln. | 56<br>1<br>2-soln. | 57<br>1<br>2-soln | 58<br>1<br>2-soln. |
|---|---|---|---|---|---|---|---|---|
| N,N'-methylenebisacrylamide | 0.23 | 0.23 | 0.23 | 0.23 | 0.23 | 0.23 | 0.23 | 0.23 |
| benzyldimethylketal | 0.23 | 0.23 | 0.23 | 0.23 | 0.23 | 0.23 | 0.23 | 0.23 |
| acrylic acid monomer | 47 | 47 | 47 | 47 | 47 | 47 | 47 | 47 |
| NaOH | — | — | — | — | 0.3 | 0.4 | — | — |
| KOH | 30 | 30 | 30 | — | 30 | 30 | 31 | 30 |
| water | 22 | 22 | 22 | 22 | 21 | 21 | 21 | 21 |
| sodium PCA | 1 | — | — | — | — | — | — | — |
| sodium lactate | — | 1 | — | — | — | — | — | — |
| potassium.PCA | — | — | 1 | — | — | — | — | — |
| potassium lactate | — | — | — | 1 | — | — | — | — |
| PCA | — | — | — | — | 0.85 | — | 0.77 | — |
| lactic acid | — | — | — | — | — | 0.80 | — | 0.70 |
| Evaluation: | | | | | | | | |
| preparability | ○ | ○ | ○ | ○ | ○ | ○ | ○ | ○ |
| gelation capacity | ○ | ○ | ○ | ○ | ○ | ○ | ○ | ○ |

TABLE 3

| Composition (wt. %) moisturizer (%) (Type) | S9<br>5<br>1-soln. | S10<br>5<br>1 soln. | S11<br>5<br>1-soln. | S12<br>5<br>1-soln. | S13<br>5<br>2-soln. | S14<br>5<br>2-soln. | S15<br>5<br>2-soln. | S16<br>5<br>2-soln. |
|---|---|---|---|---|---|---|---|---|
| N,N'-methylenebisacrylamide | 0.22 | 0.22 | 0.22 | 0.22 | 0.22 | 0.22 | 0.22 | 0.22 |
| benzyldimethylketal | 0.22 | 0.22 | 0.22 | 0.22 | 0.22 | 0.22 | 0.22 | 0.22 |
| acrylic acid monomer | 45 | 45 | 45 | 45 | 45 | 45 | 45 | 45 |
| NaOH | — | — | — | — | 1 | 2 | — | — |
| KOH | 29 | 29 | 29 | 29 | 29 | 29 | 30 | 31 |
| water | 21 | 21 | 21 | 21 | 20 | 20 | 20 | 20 |
| sodium PCA | 5 | — | — | — | — | — | — | — |
| sodium lactate | — | 5 | — | — | — | — | — | — |
| potassium PCA | — | — | 5 | — | — | — | — | — |
| potassium lactate | — | — | — | 5 | — | — | — | — |
| PCA | — | — | — | — | 4.3 | — | 3.9 | — |
| lactic acid | — | — | — | — | — | 4.0 | — | 3.5 |
| Evaluation: | | | | | | | | |
| preparability | ○ | ○ | ○ | ○ | ○ | ○ | ○ | ○ |
| gelation capacity | ○ | ○ | ○ | ○ | ○ | ○ | ○ | ○ |

TABLE 4

| Composition (wt. %) moisturizer (%) (Type) | S17<br>10<br>1-soln. | S18<br>10<br>1-soln, | S19<br>10<br>1-soln. | S20<br>10<br>2-soln. | S21<br>10<br>2-soln. | S22<br>10<br>2-soln. | S23<br>10<br>2-soln. | S24<br>10<br>2-soln. |
|---|---|---|---|---|---|---|---|---|
| N,N'-methylenebisacrylaxnide | 0.21 | 0.21 | 0.21 | 0.21 | 0.21 | 0.21 | 0.21 | 0.21 |
| benzyldiinethylketal | 0.21 | 0.21 | 0.21 | 0.21 | 0.21 | 0.21 | 0.21 | 0.21 |
| acrylic acid monomer | 43 | 43 | 43 | 43 | 43 | 43 | 43 | 43 |
| NaOH | — | — | — | — | 3 | 4 | — | — |
| KOH | 27 | 27 | 27 | 27 | 27 | 27 | 31 | 32 |
| water | 20 | 20 | 20 | 20 | 18 | 18 | 19 | 18 |
| sodium PCA | 10 | — | — | — | — | — | — | — |
| sodium lactate | — | 10 | — | — | — | — | — | — |
| potassiwn PCA | — | — | 10 | — | — | — | — | — |
| potassium lactate | — | — | — | 10 | — | — | — | — |
| PCA | — | — | — | — | 8.5 | — | 7.7 | — |
| lactic acid | — | — | — | — | — | 8.0 | — | 7.0 |
| Evaluation: | | | | | | | | |
| preparability | ○ | ○ | ○ | ○ | ○ | ○ | ○ | ○ |
| qelation capacity | ○ | ○ | ○ | ○ | ○ | ○ | ○ | ○ |

TABLE 5

| Composition (wt. %) | S25 | S26 | S27 | S28 | S29 | S30 | S31 | S32 |
|---|---|---|---|---|---|---|---|---|
| moisturizer (%) | 20 | 20 | 20 | 20 | 20 | 20 | 20 | 20 |
| (Type) | 1-soln. | 1-soln. | 1-soln. | 1-soln. | 1-soln. | 1-soln. | 1 soln. | 1-soln. |
| N,N'-methylenebisacrylamide | 0.19 | 0.19 | 0.19 | 0.19 | 0.19 | 0.19 | 0.19 | 0.19 |
| benzyldimethylketal | 0.19 | 0.19 | 0.19 | 0.19 | 0.19 | 0.19 | 0.19 | 0.19 |
| acrylic acid monomer | 38 | 38 | 38 | 38 | 38 | 38 | 38 | 38 |
| NaOH | — | — | — | — | 5 | 7 | — | — |
| KOH | 24 | 24 | 24 | 24 | 24 | 24 | 31 | 33 |
| water | 17 | 17 | 17 | 17 | 15 | 14 | 15 | 15 |
| sodium PCA | 20 | — | — | — | — | — | — | — |
| sodium lactate | — | 20 | — | — | — | — | — | — |
| potassium PCA | — | — | 20 | — | — | — | — | — |
| potassium lactate | — | — | — | 20 | — | — | — | — |
| PCA | — | — | — | — | 17 | — | 15 | — |
| lactic acid | — | — | — | — | — | 16 | — | 14 |
| Evaluation: | | | | | | | | |
| preparability | x | x | ○ | ○ | ○ | ○ | ○ | ○ |
| gelation capacity | x | x | ○ | ○ | ○ | ○ | ○ | ○ |

TABLE 6

| Composition (wt. %) | S33 | S34 | S35 | S36 | S37 | S38 | S39 | S40 |
|---|---|---|---|---|---|---|---|---|
| moisturizer (%) | 40 | 40 | 40 | 40 | 40 | 40 | 40 | 40 |
| (Type) | 1-soln. | 1-soln. | 1-soln. | 1-soln. | 2-soln. | 2-soln. | 2-soln. | 2-soln. |
| N,N'-methylenebisacrylainide | 0.14 | 0.14 | 0.14 | 0.14 | 0.14 | 0.14 | 0.14 | 0.14 |
| benzyldimethylketal | 0.14 | 0.14 | 0.14 | 0.14 | 0.14 | 0.14 | 0.14 | 0.14. |
| acrylic acid monomer | 29 | 29 | 29 | 29 | 29 | 29 | 29. | 29 |
| NaOH | — | — | — | — | 11 | 14 | — | — |
| KOH | 18 | 18 | 18 | 18 | 18 | 18 | 32 | 36 |
| water | 13 | 13 | 13 | 13 | 8 | 7 | 9 | 7 |
| sodium PCA | 40 | — | — | — | — | — | — | — |
| sodium lactate | — | 40 | — | — | — | — | — | — |
| potassium PCA | — | — | 40 | — | — | — | — | — |
| potassiwn lactate | — | — | — | 40 | — | — | — | — |
| PCA | — | — | — | — | 34 | — | 31 | — |
| lactic acid | — | — | — | — | — | 32 | — | 28 |
| Evaluation: | | | | | | | | |
| preparability | x | x | x | x | ○ | ○ | ○ | ○ |
| gelation capacity | x | x | x | x | ○ | ○ | ○ | ○ |

TABLE 7

| Composition (wt. %) | S41 | S42 | S43 | S44 | S45 | S46 | S47 | S48 |
|---|---|---|---|---|---|---|---|---|
| moisturizer (%) | 50 | 40 | 50 | 50 | 60 | 50 | 60 | 60 |
| (Type) | 2-soln. | 2-soln. | 2-soln. | 2-soln. | 2-soln. | 2-soln. | 2-soln. | 2-soln. |
| N,N'-methylenebisacrylainide | 0.09 | 0.11 | 0.09 | 0.09 | 0.08 | 0.09 | 0.08 | 0.08 |
| benzyldimethylketal | 0.09 | 0.11 | 0.09 | 0.09 | 0.08 | 0.09 | 0.08 | 0.08 |
| acrylic acid monomer | 22 | 27 | 22 | 22 | 18 | 22 | 18 | 18 |
| NaOH | 13 | 14 | — | — | 16 | 18 | — | — |
| KOH | 12 | 16 | 30 | 35 | 11 | 13 | 31 | 37 |
| water | 7 | 10 | 8 | 6 | 4 | 5 | 4 | 2 |
| sodium PCA | — | — | — | — | — | — | — | — |
| sodium lactate | — | — | — | — | — | — | — | — |
| potassium PCA | — | — | — | — | — | — | — | — |
| potassium lactate | — | — | — | — | — | — | — | — |
| PCA | 43 | — | 39 | — | 51 | — | 46 | — |
| lactic acid | — | 32 | — | 35 | — | 40 | — | 42 |
| Evaluation: | | | | | | | | |
| preparability | ○ | ○ | ○ | ○ | x | x | x | x |
| gelation capacity | ○ | ○ | ○ | ○ | x | x | x | x |

TABLE 8

| Composition (wt. %) | S49 | S50 | S51 | S52 | S53 | S54 | S55 | S56 |
|---|---|---|---|---|---|---|---|---|
| moisturizer (%) | 60 | 60 | 60 | 60 | 60 | 60 | 60 | 60 |
| (Type) | 1-soln. | 1-soln. | 1-soln. | 1-soln. | 2-soln. | 2-soln. | 2-soln. | 2-soln. |
| N,N'-methylenebisacrylamide | 0.09 | 0.09 | 0.09. | 0.09 | 0.09 | 0.09 | 0.09 | 0.09 |
| benzyldimethylketal | 0.09 | 0.09 | 0.09 | 0.09 | 0.09 | 0.09 | 0.09 | 0.09 |
| acrylic acid monomer | 19 | 19 | 19 | 19 | 19 | 19 | 19 | 19 |
| NaOH | — | — | — | — | 16 | 21 | — | — |
| KOH | 12 | 12 | 12 | 12 | 12 | 12 | 32 | 38 |
| water | 9 | 9 | 9 | 9 | 2 | −1 | 2 | 0 |
| sodium PCA | 60 | — | — | — | — | — | — | — |
| sodium lactate | — | 60 | — | — | — | — | — | — |
| potassium PCA | — | — | 60 | — | — | — | — | — |
| potassium lactate | — | — | — | 60 | — | — | — | — |
| PCA | — | — | — | — | 51 | — | 46 | — |
| lactic acid | — | — | — | — | — | 48 | — | 42 |
| Evaluation | | | | | | | | |
| preparability | x | x | x | x | x | x | x | x |
| gelation capacity | x | x | x | x | x | x | x | x |

These results indicate that when each of the components in the 2 solutions fell into within the range as specified below, the feedstock solution had an appropriate flowability and could be molded into a desired shape by casting, etc.

In the case of using pyrrolidonecarboxylic acid as the acid giving the moisturizer (1), the first solution contains an acrylic acid monomer, pyrrolidonecarboxylic acid, N,N'-methylenebisacryletalamide and benzyldimethylketal in amounts of from 20 to 50% by weight, from 1 to 43% by weight, from 0.01 to 1% by weight and from 0.01 to 1% by weight, respectively, each based on the weight of the mixture of the first solution with the second solution, while the second solution contains water and NaOH in amounts of from 7 to 25% by weight and from 0.2 to 13% by weight, respectively, each based on the weight of the mixture of the first solution with the second solution, together with KOH in such an amount as to adjust the pH value of the mixture to 4.0 to 8.0.

In the case of using lactic acid as the acid giving the moisturizer (1), the first solution contains an acrylic acid monomer, lactic acid, N,N'-methylenebisacryletalamide and benzyldimethylketal in amounts of from 20 to 50% by weight, from 1 to 32% by weight, from 0.01 to 1% by weight and from 0.01 to 1% by weight, respectively, each based on the weight of the mixture of the first solution with the second solution, while the second solution contains water and NaOH in amounts of from 10 to 25% by weight and from 0.3 to 32% by weight, respectively, each based on the weight of the mixture of the first solution with the second solution, together with KOH in such an amount as to adjust the pH value of the mixture to 4.0 to 8.0.

In the case of using pyrrolidonecarboxylic acid as the acid giving the moisturizer (2), the first solution contains an acrylic acid monomer, pyrrolidonecarboxylic acid, N,N'-methylenebisacryletalamide and benzyldimethylketal in amounts of from 20 to 50% by weight, from 1 to 43% by weight, from 0.01 to 1% by weight and from 0.01 to 1% by weight, respectively, each based on the weight of the mixture of the first solution with the second solution, while the second solution contains water in an amount of from 8 to 25% by weight based on the weight of the mixture of the first solution with the second solution and KOH in such an amount as to adjust the pH value of the mixture to 4.0 to 8.0.

In the case of using lactic acid as the acid giving the moisturizer (2), the first solution contains an acrylic acid monomer, lactic acid, N,N'-methylenebisacryletalamide and benzyldimethylketal in amounts of from 20 to 50% by weight, from 1 to 35% by weight, from 0.01 to 1% by weight and from 0.01 to 1% by weight, respectively, each based on the weight of the mixture of the first solution with the second solution, while the second solution contains water in an amount of from 6 to 25% by weight based on the weight of the mixture of the first solution with the second solution and KOH in such an amount as to adjust the pH value of the mixture to 4.0 to 8.0.

Although a single acid was employed as the acid giving the moisturizer in Examples and trial products, the combined use of these acids can achieve the same effects.

In Examples 1 to 4 shown in Table 1 and the trial products S1 to S56 shown in Tables 2 to 8, acrylic acid was used as the radical-polymerizable unsaturated compound. Alternatively, use can be made as a substitute therefor of other radical-polymerizable unsaturated compounds such as methacrylic acid, crotonic acid, itaconic acid, acrylamide, methacrylamide, 2-acrylamido-2-methylpropanesulfonic acid and polymers of salts thereof, an acrylic acid/vinylpyrrolidone mixture, a vinyl acetate/ethylene mixture and a vinyl acetate/dioctyl maleate mixture to thereby achieve the same effects.

Similarly, benzyldimethylketal capable of initiating photopolymerization was employed as the polymerization initiator. Alternatively, use can be made as a substitute therefor of 1-hydroxycyclohexyl phenyl ketone, an eutectic mixture of 1-hydroxycyclohexyl phenyl ketone with benzophenone, 2-methyl-1-[4-(methylthio)phenyl]-2-morpholinopropanone-1,2-benzyl-2-dimethylamino-1-(4-morpholinophenyl)butanone-1,2-hydroxy-2-methyl-1-phenyl-propan-1-one, a mixture of 2-hydroxy-2-methyl-1-phenyl-propan-1-one with 2,4,6-trimethylbenzoyldiphenylphosphine oxide, a mixture of 2-hydroxy-2-methyl-1-phenylpropan-1-one with bisacylphosphine oxide, 1-[4-(2-hydroxyethoxy)phenyl]-2-hydroxy-2-methyl-1-propan-1-one and bis(cyclopentadienyl)-bis(2,6-difluoro-3-(pyr-1-yl)titanium to thereby achieve the same effects.

In each of Examples, the composition was produced by photopolymerization. However, it is also possible to produce the composition by heat polymerization. In such a case, use can be made of a polymerization initiator selected from azobisisobutyronitrile, benzoyl peroxide, lauroyl peroxide, methyl ethyl ketone peroxide, cyclohexanone peroxide, t-butyl hydroperoxide, di-t-butyl peroxide, di-t-amyl peroxide, dicumyl peroxide and t-butyl perbenzoate. The composition thus produced exhibits effects comparable to those achieved by the one produced by photopolymerization.

Similarly, N,N'-methylenebisacrylamide, which is a radical-polymerizable, polyfunctional and unsaturated material, was employed in Examples as the crosslinking agent. Alternatively, usable examples of other radical-polymerizable, polyfunctional and unsaturated materials include ethylene glycol dimethacrylate, polyethylene glycol 400 diacrylate, diethylene glycol diacrylate, 1,3-butanediol diacrylate, 1,4-butanediol diacrylate, 1,6-hexanediol diacrylate, neopentylglycol diacrylate, neopentyl glycol diacryl hydroxypivalate, trimethylolpropane triacrylate, pentaerythritol triacrylate, dipentaerythritol hexaacrylate and trimethylolpropane trimethacrylate to thereby achieve the same effects.

While the invention has been described in detail and with reference to specific examples thereof, it will be apparent to one skilled in the art that various changes and modifications can be made therein without departing from the spirit and scope thereof.

What is claimed is:

1. A process for producing a conductive gel composition for a biological electrode having a function of electrically and physically connecting a living body to an electrode element and comprising the following components:
   (1) a radical-polymerizable unsaturated compound;
   (2) an acid reacting with NaOH or KOH to thereby give a reaction product which is a moisturizer serving as a plasticizer and having a function of supplementing and promoting the physiological humidifying function of a horny layer;
   (3) water;
   (4) NaOH and/or KOH;
   (5) a photopolymerization or heat polymerization initiator; and
   (6) a crosslinking agent; which comprises preparing a first solution containing at least the components (1) and (2) and a second solution containing at least the components (3) and (4) independently, wherein components (5) and (6) are added to either the first or second solution, mixing the first and second solutions together and then subjecting the resulting mixture to irradiation with light or heating.

2. A process for producing a conductive composition for a biological electrode as claimed in claim 1, wherein said unsaturated compound is selected from the group consisting of acrylic acid, methacrylic acid, crotonic acid, itaconic acid, acrylamide, methacrylamide, 2-acrylamide-2-methylpropanesulfonic acid and polymers of salts thereof, an acrylic acid/vinylpyrrolidone mixture, a vinyl acetate/ethylene mixture and a vinyl acetate/dioctyl maleate mixture.

3. A process for producing a conductive composition for a biological electrode as claimed in claim 1, wherein said acid employed as the component (2) is lactic acid, pyrrolidonecarboxylic acid or a combination thereof.

4. A process for producing a conductive composition for a biological electrode as claimed in claim 1, wherein said photopolymerization initiator is selected from the group consisting of benzildimethylketal, 1-hydroxycyclohexyl phenyl ketone, an eutectic mixture of 1-hydroxycyclohexyl phenyl ketone with benzophenone, 2-methyl-1-[4-(methylthio)phenyl]-2-morpholinopropanone-1, 2-benzyl-2-dimethylamino-1-(4-morpholinophenyl)butanone-1, 2-hydroxy-2-methyl-1-phenyl-propan-1-one, a mixture of 2-hydroxy-2-methyl-1-phenyl-propan-1-one with 2,4,6-trimethylbenzoyldiphenylphosphine oxide, a mixture of 2-hydroxy-2-methyl-1-phenylpropan-1-one with bisacylphosphine oxide, 1-[4-(2-hydroxyethoxy)-phenyl]-2-hydroxy-2-methyl-1-propan-1-one and bis(cyclopentadienyl)-bis(2,6-difluoro-3-(pyr-1-yl)titanium.

5. A process for producing a conductive composition for a biological electrode as claimed in claim 1, wherein said heat polymerization initiator is selected from the group consisting of azobisisobutyronitrile, benzoyl peroxide, lauroyl peroxide, methyl ethyl ketone peroxide, cyclohexanone peroxide, t-butyl hydroperoxide, di-t-butyl peroxide, di-t-amyl peroxide, dicumyl peroxide and t-butyl perbenzoate.

6. A process for producing a conductive composition for a biological electrode as claimed in claim 1, wherein said crosslinking agent is selected from the group consisting of N,N'-methylenebisacrylamide, ethylene glycol dimethacrylate, polyethylene glycol 400 diacrylate, diethylene glycol diacrylate, 1,3-butanediol diacrylate, 1,4-butanediol diacrylate, 1,6-hexanediol diacrylate, neopentylglycol diacrylate, neopentyl glycol diacryl hydroxypivalate, trimethylolpropane triacrylate, pentaerythritol triacrylate, dipentaerythritol hexaacrylate and trimethylolpropane trimethacrylate.

7. A process for producing a conductive composition for a biological electrode as claimed in claim 1, wherein the first solution contains an acrylic acid monomer as the unsaturated compound, pyrrolidonecarboxylic acid as the acid giving a moisturizer, N,N'-methylenebisacryletalamide as the crosslinking agent and benzyldimethylketal as the photopolymerization initiator in amounts of from 20 to 50% by weight, from 1 to 43% by weight, from 0.01 to 1% by weight and from 0.01 to 1% by weight, respectively, each based on the weight of the mixture of the first solution with the second solution, while the second solution contains water and NaOH in amounts of from 7 to 25% by weight and from 0.2 to 13% by weight, respectively, each based on the weight of the mixture of the first solution with the second solution, together with KOH in such an amount as to adjust the pH value of the mixture to 4.0 to 8.0.

8. A process for producing a conductive composition for a biological electrode as claimed in claim 1, wherein the first solution contains an acrylic acid monomer as the unsaturated compound, lactic acid as the acid giving a moisturizer, N,N'-methylenebisacryletalamide as the crosslinking agent and benzyldimethylketal as the photopolymerization initiator in amounts of from 20 to 50% by weight, from 1 to 32% by weight, from 0.01 to 1% by weight and from 0.01 to 1% by weight, respectively, each based on the weight of the mixture of the first solution with the second solution, while the second solution contains water and NaOH in amounts of from 10 to 25% by weight and from 0.3 to 32% by weight, respectively, each based on the weight of the mixture of the first solution with the second solution, together with KOH in such an amount as to adjust the pH value of the mixture to 4.0 to 8.0.

9. A process for producing a conductive composition for a biological electrode as claimed in claim 1, wherein the first solution contains an acrylic acid monomer as the unsaturated compound, pyrrolidonecarboxylic acid as the acid giving a moisturizer, N,N'-methylenebisacryletalamide as the crosslinking agent and benzyldimethylketal as the photopolymerization initiator in amounts of from 20 to 50% by weight, from 1 to 43% by weight, from 0.01 to 1% by weight and from 0.01 to 1% by weight, respectively, each based on the weight of the mixture of the first solution with the second solution, while the second solution contains water in an amount of from 8 to 25% by weight based on the weight of the mixture of the first solution with the second solution and KOH in such an amount as to adjust the pH value of the mixture to 4.0 to 8.0.

10. A process for producing a conductive composition for a biological electrode as claimed in claim 1, wherein the first solution contains an acrylic acid monomer as the unsaturated compound, lactic acid as the acid giving a moisturizer, N-N' methylenebisacryletalamide as the crosslinking agent and benzyldimethylketal as the photopolymerization initiator in amounts of from 20 to 50% by weight, from 1 to 35% by weight, from 0.01 to 1% by weight and from 0.01 to 1% by weight, respectively, each based on the weight of the mixture of the first solution with the second solution, while the second solution contains water in an amount of from 6 to 25% by weight based on the weight of the mixture of the first solution with the second solution and KOH in such an amount as to adjust the pH value of the mixture to 4.0 to 8.0.

* * * * *